United States Patent

Hotea et al.

[11] Patent Number: 5,741,143
[45] Date of Patent: Apr. 21, 1998

[54] COMBUSTION CHAMBER SENSOR CONNECTOR

[75] Inventors: Gheorghe Hotea, Griesheim; Michael Karl Albin Wenzel, Alzenau, both of Germany

[73] Assignee: The Whitaker Corporation, Wilmington, Del.

[21] Appl. No.: 679,352

[22] Filed: Jul. 11, 1996

[30] Foreign Application Priority Data

Jul. 26, 1995 [GB] United Kingdom ............... 9516285

[51] Int. Cl.[6] .................................................. H01R 13/658
[52] U.S. Cl. .......................... 439/86; 439/610; 439/620
[58] Field of Search .................................. 439/607, 608, 439/620, 610, 86, 88–90

[56] References Cited

U.S. PATENT DOCUMENTS

| | | | |
|---|---|---|---|
| 3,344,391 | 9/1967 | Ruete | 439/89 |
| 4,079,343 | 3/1978 | Nijman | 439/88 |
| 4,212,510 | 7/1980 | Ritchie et al. | 439/90 |
| 4,276,523 | 6/1981 | Boutros et al. | 439/90 |
| 4,296,390 | 10/1981 | Vanderheyden et al. | 439/90 |
| 4,886,463 | 12/1989 | Scott et al. | 439/89 |
| 4,929,195 | 5/1990 | Seidoh et al. | 439/88 |
| 5,352,126 | 10/1994 | Kuboshima et al. | 439/89 |
| 5,364,292 | 11/1994 | Bethurum | 439/88 |

Primary Examiner—Gary F. Paumen

[57] ABSTRACT

A combustion chamber sensor connector comprises a conductive outer housing within which is mounted a certain length of shielded cable connected to receptacle terminals that receive pins of a sensor. A shield element extends across the inside of the outer housing to provide a shield means between the sensor and the cable leads. The shield is an injection molded conductive elastomer. Pads of a similar material are molded over portions of the terminals. Filter elements are positioned between the pads and the shield. The elastomeric shield and pads provide a shock resistant connection that is necessary for such applications. In-molding of the shield also provide a compact and cost-effective design.

12 Claims, 2 Drawing Sheets

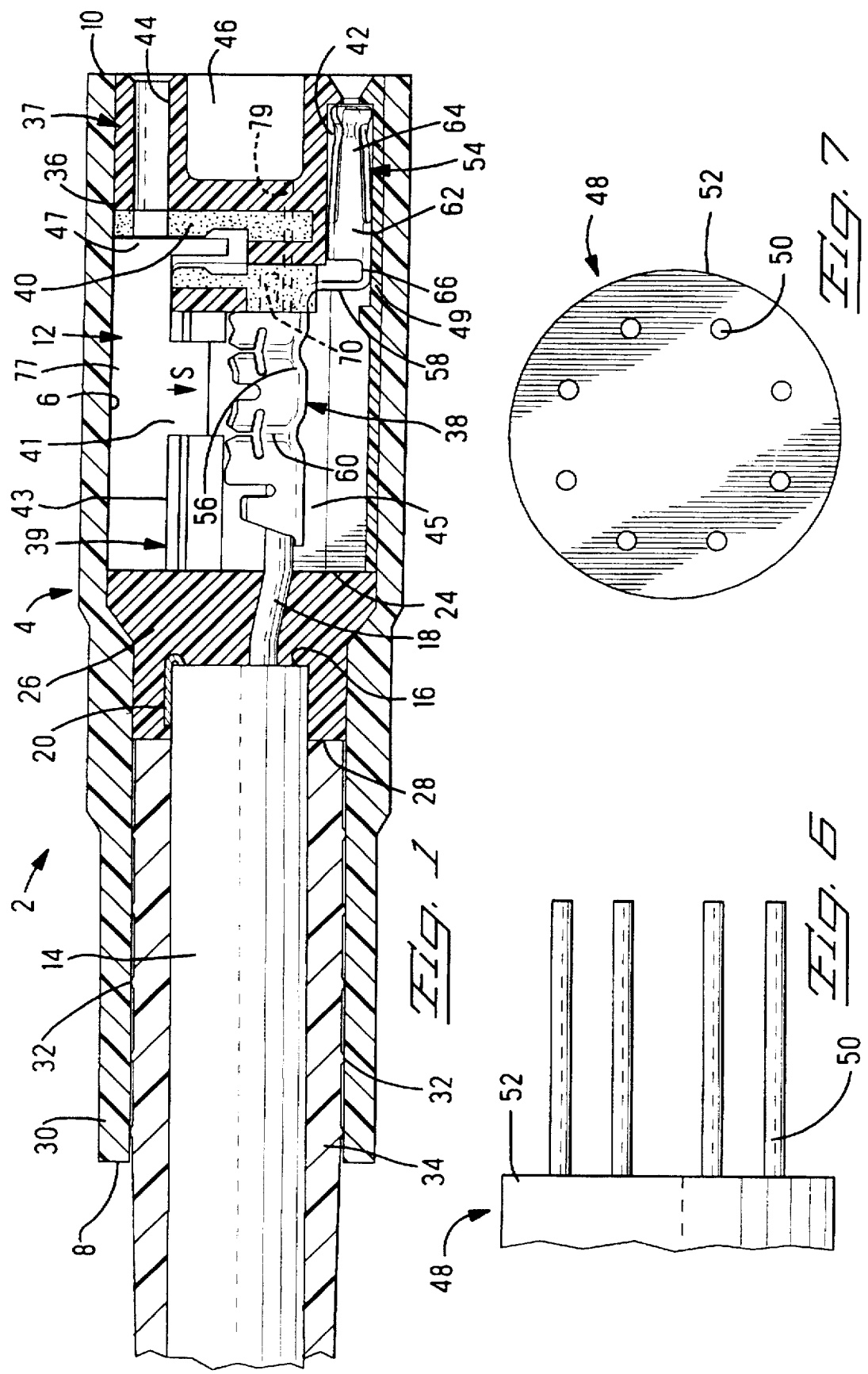

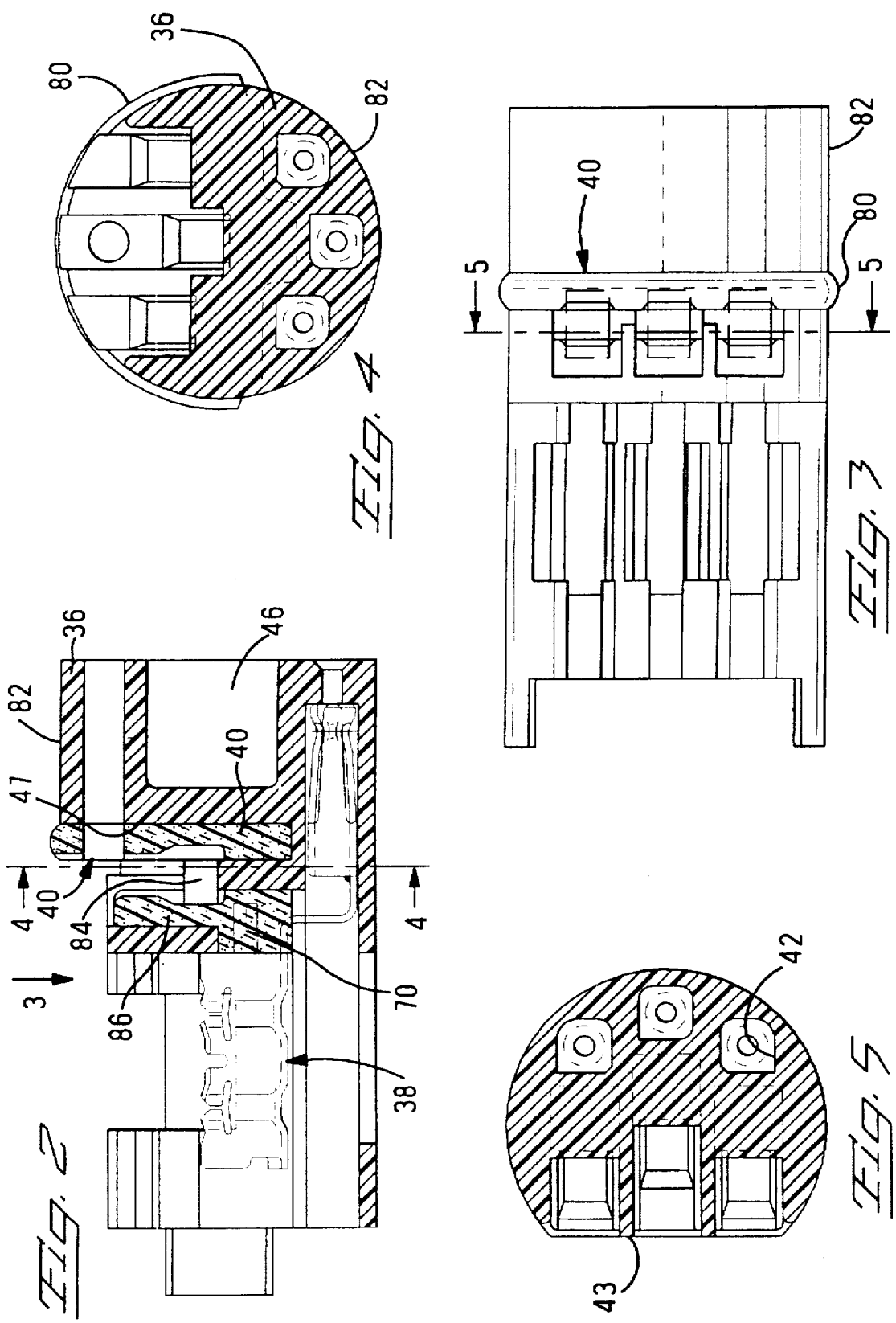

COMBUSTION CHAMBER SENSOR CONNECTOR

BACKGROUND OF THE INVENTION

1. Field of the Invention

This invention relates to an electrical connector for coupling to a sensor mounted in a combustion chamber, the connector being resistant to shock and electrostatic and electromagnetic interference.

2. Description of the Prior Art

In the automotive industry, pressure sensors have been developed for positioning in combustion chambers of combustion engines to determine the combustion characteristics (pressure over time) of the ignited fuel within the piston chamber. Such sensors might comprise a piezo electrical device for measuring the pressure variations, or other electrically driven pressure sensors, which thus need to be supplied with leads for electrical power and signal transmission. Due to the high electrostatic and electromagnetic interference generated by ignition of the spark in the piston chamber, the signal leads need to be protected from this interference by shielding and possibly filtering. A further problem are the high shocks generated by the combustion. The connector must be able to withstand the shocks over the specified life of the combustion engine whilst making reliable connection with the sensor.

SUMMARY OF THE INVENTION

It is an object of this invention to provide a combustion chamber sensor connector that provides a reliable connection to a sensor mounted on a combustion chamber, in a cost-effective manner.

It is a further object of this invention to provide a combustion chamber sensor connector that protects the signal leads leading to the sensor from excessive electromagnetic and electrostatic interference generated by spark ignition, and furthermore a connector that can withstand the shocks generated by the combustion over the required lifetime of the engine.

The objects of this invention have been achieved by providing a combustion chamber sensor connector comprising an outer housing having a cavity extending therethrough, and a connection section mounted therein that has an insulative housing and terminals for connection to leads of a sensor cable, further comprising a conductive shield member mounted transversely to the passage of the cavity and extending substantially fully thereacross except for around the terminals which project past the shield member.

In the preferred embodiment, the shield member is a mouldable conductive material with resilient properties, such as a conductive elastomeric or plastic material that can be in-moulded to the insulative housing. The inner housing may be fully received within the outer housing, the inner housing comprising cavities for receiving receptacle contact portions of the terminals for electrical contact with pin contacts of the sensor. The contact portions may be integral with an insulation displacement contact (IDC) connection portion for contacting the sensor leads, the housing having a plurality of slots extending substantially parallel to each other from an outer surface of the housing to the IDC connection sections to allow stuffing of the leads into the IDC sections therethrough.

The terminals could further comprise additional contact legs extending therefrom for electrical contact to a pole of a capacitor or another filter element, the other pole of the filter element electrically connected to the shield member. Connection of the contact legs to the shielding could be by overmoulding of the conductive shielding material over the legs. The shielding is electrically connected to the shielding of the cable via the outer housing. The moulded shielding would have an outer periphery received against an inner wall of the outer housing for electrical contact therewith.

The outer housing would thus be an electrical conductor, for example a metal, which is electrically connected to conductive shielding of the cable at a cable receiving end. Such cable may have a drain wire, which could be electrically connected to the outer housing by overmoulding an end portion of the cable beyond which the leads extend with a conductive material, for example a conductive plastic material that is easy to mould. The outer housing could be provided to extend along a certain length of the cable and the space therebetween injected with a plastic or elastomeric material to securely attach the cable to the outer housing to provide sufficient strain relief for axial and bending forces on the wire.

Resistance to shock could be enhanced by tight abutment of the inner housing against the cable end overmouldings, and the resilient properties of the shielding, a well as overmoulding directly over contact legs to eliminate play.

BRIEF DESCRIPTION OF THE DRAWINGS

FIG. 1 is a cross-sectional view through a first embodiment of this invention;

FIG. 2 is a cross-sectional view without outer housing and cable;

FIG. 3 is a view in the direction of arrow 3 of FIG. 2;

FIG. 4 is a cross-sectional view through line 4—4 of FIG. 2;

FIG. 5 is a cross-sectional view through another line 5—5 of FIG. 3; and

FIGS. 6 and 7 are respectively top and cross-sectional views of sensor contacts.

DETAILED DESCRIPTION OF THE PREFERRED EMBODIMENT

Referring to FIGS. 1–5, a combustion chamber sensor connector 2 comprises an outer housing 4 having a cavity 6 extending therethrough from a cable receiving end 8 to a sensor receiving end 10, and a connection section 12 positioned within the outer housing 4. The connection section 12 extends from the sensor end 10 to an intermediate position within the cavity 6.

A sensor cable 14 extends into the cavity 6 through the cable receiving end 8 to its end 16 proximate the connection section 12, where leads 18 of the cable 14 then continue into the connection section 12 for electrical connection therewith. The cable 14 has an outer insulative layer surrounding a conductive shielding that surrounds the plurality of leads 18 (in this case three). In order to electrically connect the shielding of the cable to ground, a drain wire 20 is provided, and in this case folded back over the outside of the cable 14 from the end 16. A section of the cavity 6 from a cable end 24 of the connection section 12 to a position beyond the drain wire 20 is injection moulded with a conductive plastic material 26 that electrically interconnects the drain wire 20 (and therefore the cable shielding) to the outer housing which in this embodiment is made of metal and thus acts as shielding around the connector. The cable end overmoulding 26 also acts as a strain relief member to securely retain the cable to the outer housing. The outer housing 4 is connected to ground via a casing around the sensor which is connected to the engine block of the combustion chamber.

Extending from a rear end 28 of the conductive moulded section 26 is an elastomeric or other flexible tubular member 34 filling the space between the cable and the outer housing rear end that extends over a certain length of the cable. The surface of the tubular member 34 is provided with circumferential ribs 32 to seal against the housing 4. The tubular member 34 extends beyond the cable receiving end 8 out of the housing cavity 6 in order to stiffen and protect the cable from overbending which is most critical at the outlet of the housing 4. It would of course also be conceivable to provide the tubular member 34 in the same material as the grounding section 26 to simplify the moulding thereof, where the ribs 32 would enhance the electrical contact against the outer housing.

The connection section 12 comprises an insulative housing 36, a plurality of terminals 38 mounted in the housing 36, and a shield member 40. The housing 36 comprises a sensor receiving section 37 and a cable receiving section 39 on either side of the shield member 40. The insulative housing 36 comprises a plurality of receptacle contact receiving cavities 42 extending therein from the sensor end 10, and further sensor contact receiving cavities 44 also extending from the sensor end 10 therein, the cavities 42,44 disposed circumferentially around a central portion 46 of the housing 36. As can be seen in FIGS. 7 and 8, a connection end 48 of a sensor is shown comprising a plurality of pin contacts 50 disposed circumferentially around, proximate the outer surface 52 of the sensor. Only three of these pins are used for electrical connection to the cable 14, the other five pins being redundant and only used for calibration of the sensor prior to assembly to the connector 2. The vacant cavities 44 of the housing 36 thus are only for reception of the redundant pins, the three contact pins being inserted into the receptacle contact receiving cavities 42 for connection with the terminals 38.

The terminals 38 comprise a receptacle contact section 54 received within the housing cavities 42, attached to a lead connection section 56 via a transition strip 58. The terminal 38 is stamped and formed from sheet metal. The lead connection section 56 comprises insulation displacement contacts for connection to electrical strands of the leads by cutting through the lead outer insulation and contacting the inner strands. The insulation displacing contact (IDC) 60 thus cuts through the outer insulation when the lead 18 is stuffed in the direction of arrow S into the IDC contacts. Other known connection means such as crimping or soldering could of course be considered, however IDC connection provides a rapid and cost-effective solution.

Each receptacle contact 54 comprises a cylindrical base portion 62 which extends into two pairs of opposed contact arms 64 forming a pin receiving cavity to receive and contact the pin contacts 50 with four points of contact. The receptacle contact extends into the transition strip 58 proximate and along the outer housing 10 as it extends past the shield member 40 to allow the shield element to extend as far as possible across the cavity 6 for reasons that will be understood herebelow. The transition strip 58 is bent at a right angle and can thus act as a flexible member in the longitudinal direction of the outer housing for compensating thermal expansion/contraction of the various components to which the terminals are attached.

The cable receiving section 39 of the housing 36 comprises slots extending from one side 43, the slots 41 each for receiving a connection section of the terminals 38 to allow passage of the wire therethrough for connection to the terminal. A base wall 45 of the slots 41 provides a seat for positioning of the terminal connection section thereagainst. Due to the transverse positioning of the shield member 40 across most of the cavity 6, the housing 36 comprises a slot 47 separating the sensor section 37 from the cable section 39.

Referring to FIGS. 2–5, the shield member will now be described. The shield member 40 is comprised of a conductive, elastomeric material that is injection moulded into the slot 47 during manufacture of the connection assembly. A periphery 80 of the sealed member 40 protrudes beyond an outer surface 82 of the housing 36 for resilient compression against the surface of the cavity 6. The latter ensures good electrical contact with the shielding over a large surface area for effective shielding. The material of the shield would preferably be a conductive elastomer, but could also be a conductive plastic material or other deformable conductive material that can be injection moulded. A large advantage of moulding is the cost-effective and automated manufacture thereof, as well as enabling formation of a relatively complicated design that is compact and securely held within the housing 36. Due to the in-moulding of the shield to the housing, there is also no play therebetween, thereby increasing resistance to shock between the housing and shielding. Filter components 84, which in this example are capacitive elements, are electrically interconnected between the shielding 40 and the terminals 38. One pole of a filter element 84 is electrically connected to the shield 40 and the other pole is electrically connected to a conductive moulded material 86, similar to the shield material, this in-moulded, material 86 being overmoulded over a tab extension 70 integrally extending from the terminal 38 for electrical contact therebetween.

For each terminal 38, there is a distinct and separate conductive in-moulding 86 for interconnecting the terminals to the filter elements. The filter elements suppress electromagnetic and electrostatic noise generated by ignition of the spark plugs. Due to the positioning of the filter elements 84 between two elastomeric, conductive in-moulded sections, play is removed. Furthermore, the resiliency of the materials absorbs excessive shocks transmitted through the connector thereby ensuring reliable lifelong connection.

Referring to FIG. 1, the connector assembly 2 can be provided with small holes 79 that traverse the inner housing and shield member to provide access to a cavity area 77 between the shield member and cable for injecting this remaining cavity area with a hardenable liquid material such as a silicon rubber, epoxy or molten plastic. Once the connector 2 is assembled, a needle for injecting the fluid can be inserted through the hole 79 and liquid is injected until the cavity area 77 is filled up to the shield member. Hardening of this material would provide an extremely robust and reliable retention of the connection between the lead, terminals, and housing to withstand the high shocks generated by combustion. After injection of the hardenable fluid, the sensor can be mounted to the connector.

Advantageously therefore, transverse extension of shielding across the sensor connector separating the sensor from the leads reduces transmission of electromagnetic noise to the leads. In-moulding of conductive plastics or elastomeric material for the shielding and filter element connection sections ensures not only a cost-effective and compact design, but also provides a shock resistant assembly for reliable functioning of the connector assembly. Furthermore, integral moulding of conductive material around the cable end on the one hand reduces any play, and on the other hand provides a reliable ground connection of the cable shielding. Extension of an outer housing along a certain length of the cable as well as provision of a tubular member therebetween provides sealing as well as strong strain relief of the cable with respect to tensile and bending forces. Extension of the terminal receiving housing from a sensor end to abutment with cable end overmoulding eliminates play therebetween and thus enhances resistance to shock. Positioning of capacitors between the resilient shielding removes play and increases resistance to shock generated by the combustion. Filling of the cavity area around the terminal connection section between the cable and the shield member further increases resistance to shock.

We claim:

1. A combustion chamber sensor connector comprising an outer housing securely fixable to a sensor, the outer housing having a cavity extending therethrough for receiving a shielded sensor cable therein at one end and contacts of the sensor at the other end, the connector further comprising a connection section mounted in the outer housing for interconnecting leads of the cable to the sensor contacts, wherein the connection section comprises a discrete insulative housing and terminals for connection to the leads, and a conductive shield member mounted transverse to the outer housing cavity, the shield member being made of a conductive plastic or conductive elastomeric material, and wherein an outer periphery of the shield member protrudes beyond an outer surface of the insulative housing for compression against an inner surface of the cavity, for electrical connection thereto.

2. The connector of claim 1 wherein the shield member is in-moulded to the insulative housing.

3. The connector of claim 1 wherein the outer periphery extends around a substantial part of the insulative housing.

4. The connector of claim 1 wherein conductive pads of elastomeric or plastic material similar to the shield material are connected to each terminal, and filter elements for electromagnetic or electrostatic noise suppression are positioned between the pads and shield.

5. The connector of claim 4 wherein the pads are integrally moulded in the housing.

6. The connector of claim 5 wherein the terminals comprise tabs extending therefrom embedded in the pads for electrical connection thereto.

7. The connector of claim 4 wherein the filter elements are resiliently held between the pads and shield by resilient compression of the pads and shield.

8. The connector of claim 1, wherein the terminals are stamped and formed from sheet metal and comprise a connection section for connection to the leads, and a receptacle contact section for contacting the sensor contacts, the contact and connection sections being joined by a transition section comprising an integral thin strip that has a section disposed proximate the outer housing to enable the shield to extend across the cavity as far as possible for effective shielding of the leads from the sensor.

9. The connector of claim 8, wherein the transition section is bent transversely to absorb thermal movements in the longitudinal direction of the connector.

10. The connector of claim 1, wherein the insulative housing extends from abutment with a cable end member to a sensor mating end for removing all play therebetween.

11. The connector of claim 1, wherein a hole is provided through the insulative housing and shield member for injection of a hardenable fluid within a cavity area surrounding the terminal connection section.

12. The connector of claim 1, wherein a cavity area surrounding the terminal connection section between the cable and the shield member is filled with a hardened material injected therein, for secure shock-resistant retention of the terminals, shield member and leads.

* * * * *